US00H002254H

(19) United States
(12) Statutory Invention Registration
Hebert et al.

(10) Reg. No.: US H2254 H
(43) Published: Jun. 7, 2011

(54) FLOATING PLATFORM FOR REMOTE BASING

(75) Inventors: James L. Hebert, Waldorf, MD (US); Eric C. Hansen, Norfolk, VA (US)

(73) Assignee: United States of America as represented by the Secretary of the Navy, Washington, DC (US)

(21) Appl. No.: 12/290,866

(22) Filed: Nov. 4, 2008

Related U.S. Application Data

(60) Provisional application No. 61/005,117, filed on Nov. 26, 2007.

(51) Int. Cl.
*B63B 35/40* (2006.01)

(52) U.S. Cl. ..... 114/259; 114/261

(58) Field of Classification Search ..... 114/259, 114/261
See application file for complete search history.

(56) References Cited

U.S. PATENT DOCUMENTS

| | | | | | |
|---|---|---|---|---|---|
| 1,896,546 | A | * | 2/1933 | Kulik | 114/261 |
| 2,141,181 | A | * | 12/1938 | Geddes | 114/259 |
| 2,405,115 | A | * | 8/1946 | Creed | 114/261 |
| 3,671,971 | A | * | 6/1972 | Goodbody | 343/710 |
| 4,416,433 | A | * | 11/1983 | Bellina | 244/33 |
| 5,277,117 | A | * | 1/1994 | Bender et al. | 102/402 |
| 6,591,775 | B2 | | 7/2003 | Robinson | 114/264 |
| 7,147,240 | B2 | | 12/2006 | Naito | 280/414.1 |
| 2007/0034739 | A1 | * | 2/2007 | Yoeli | 244/23 R |

* cited by examiner

*Primary Examiner*—Dan Pihulic
(74) *Attorney, Agent, or Firm*—Gerhard W. Thielman

(57) ABSTRACT

An unmanned floating platform is provided for continual surveillance at a station-keeping position at sea. The platform is equipped to dispatch an unmanned vehicle to conduct at least one of observation and rendezvous. The platform includes a hull, first and second hangers, and a liquid storage compartment. The hull has a submerged portion and a floating portion. The first hanger is equipped for stowing, deploying and retrieving a self-propelled unmanned vehicle and is substantially disposed in the floating portion. The second hanger houses equipment for electrical power and on-board functions. The liquid storage compartment supplies fuel to the on-board equipment and to the unmanned vehicle. For static stability, the compartment is disposed in the submerged portion. The platform may also include a superstructure for housing sensor equipment. The superstructure can be disposed above at least one of the first and second hangers. The second hanger may additionally house a tetherable observation aerial post.

6 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FLOATING PLATFORM FOR REMOTE BASING

CROSS REFERENCE TO RELATED APPLICATION

Pursuant to 35 U.S.C. §119, the benefit of priority from provisional application 61/005,117 with a filing date of Nov. 26, 2007, is claimed for this non-provisional application.

STATEMENT OF GOVERNMENT INTEREST

The invention described was made in the performance of official duties by one or more employees of the Department of the Navy, and thus, the invention herein may be manufactured, used or licensed by or for the Government of the United States of America for government purposes without the payment of any royalties thereon or therefor.

BACKGROUND

The invention relates generally to unmanned semi-autonomous remote basing at sea or littoral waters. In particular, this invention relates to a floating platform equipped with unmanned patrol vehicles as sentries.

Conventional long-term surveillance over regions having only intermittent human traffic, such as some coastal approaches, involve expensive and potentially hazardous human-occupied craft for detection and interdiction of unknown, possibly hostile vehicles. Shore-based remote sensing, such as by long-range radar systems provide limited observation capability. However, often assets are too disposed distant from the surveillance region to rendezvous with the observed vehicle before its departure.

SUMMARY

Conventional long-term observation options at sea yield disadvantages addressed by various exemplary embodiments of the present invention. In particular, dedication of expensive manned platforms with attendant risks for personnel and operational costs render such surveillance impractical.

Various exemplary embodiments provide an unmanned floating platform for continual surveillance at a station-keeping position at sea. The platform is equipped to dispatch an unmanned vehicle to conduct at least one of observation and rendezvous. The platform includes a hull, first and second hangers, and a liquid storage compartment. The hull has a submerged portion and a floating portion. The first hanger is equipped for stowing, deploying and retrieving a self-propelled unmanned vehicle and is substantially disposed in the floating portion. The second hanger houses equipment for electrical power and on-board functions.

The liquid storage compartment supplies fuel to the on-board equipment and to the unmanned vehicle. For static stability, the compartment is disposed in the submerged portion. In various exemplary embodiments, the platform may also include a superstructure for housing sensor equipment. The superstructure can be disposed above at least one of the first and second hangers. The second hanger may additionally shelter a tetherable observation aerial post.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Figure 1:
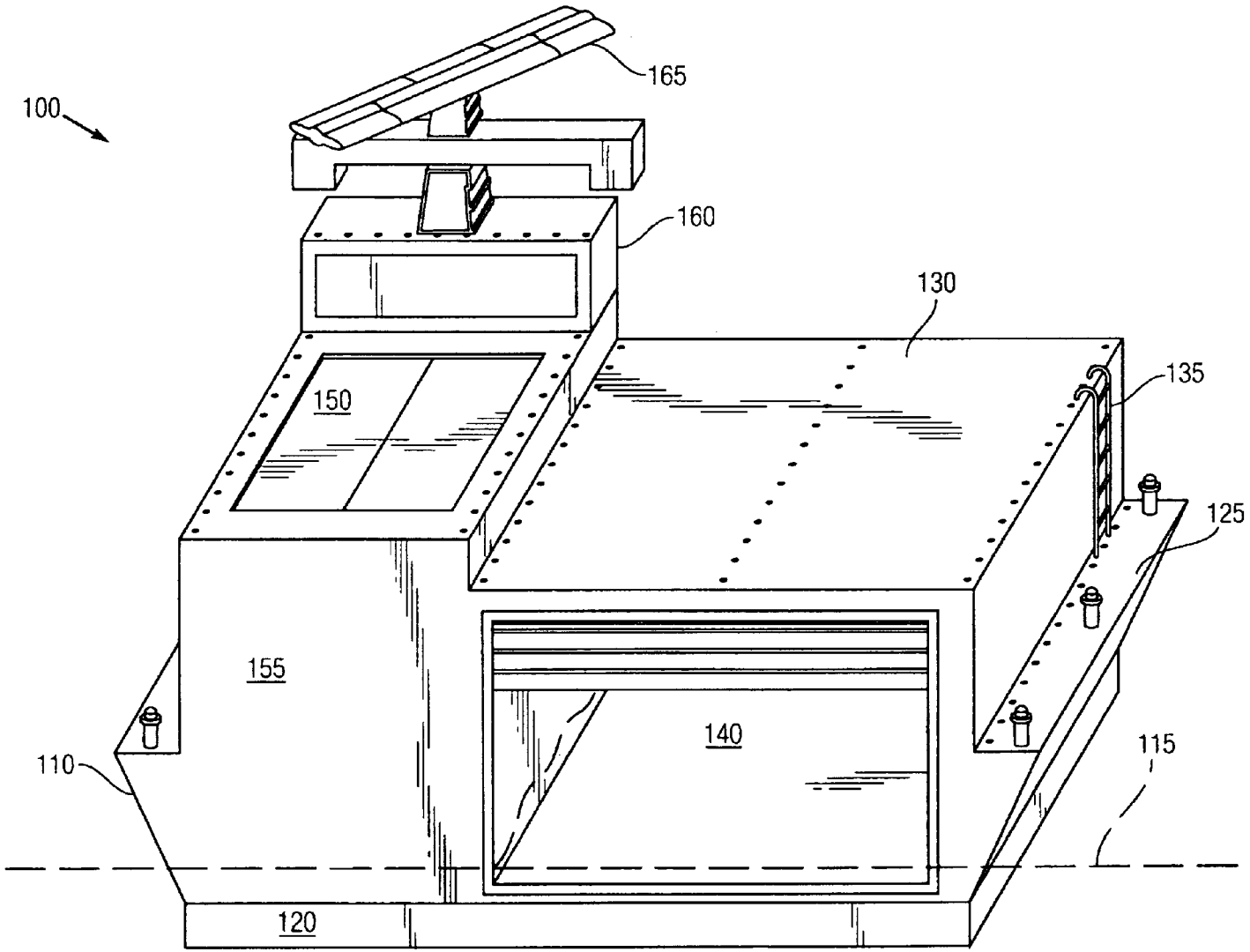
FIG. 1 is an isometric view of a floating platform in a first embodiment.

FIG. 1 shows in perspective a first embodiment 100 of a remote sea base platform. The platform includes a floating hull 110 shown from the stern with a lower portion submerged below the waterline 115. This submerged portion includes a fuel storage compartment 120 (that may be subdivided by bulkheads). This submerged disposition of the compartment 120 augments static stability of the hull 110. Above the waterline 115, the hull 110 includes boarding access ledges 125 that can flank port and starboard. The hull 110 is shown as having a shallow draft.

On the starboard side, the hull 110 includes an operations roof 130 that covers a hanger 140 for stowage of one or more unmanned surface and submersible vehicles assigned for extended-range patrol. A ladder 135 provides access to the roof 130 from the starboard access 125. The vehicles can be launched from and retrieved through vertically raised door that opens leading aft, the floor of the first hanger 140 being submerged below the waterline 115.

On the port side, the hull 110 includes aerostat doors 150 that open above to the sky availing access to a second hanger 155 for power equipment and unmanned aerial vehicles, such as an instrumented lighter-than-air balloon. At the port forecastle (towards the bow), the hull 110 includes an antenna housing 160 with mast and aerials 165 for active radar sweeps.

Figure 2:
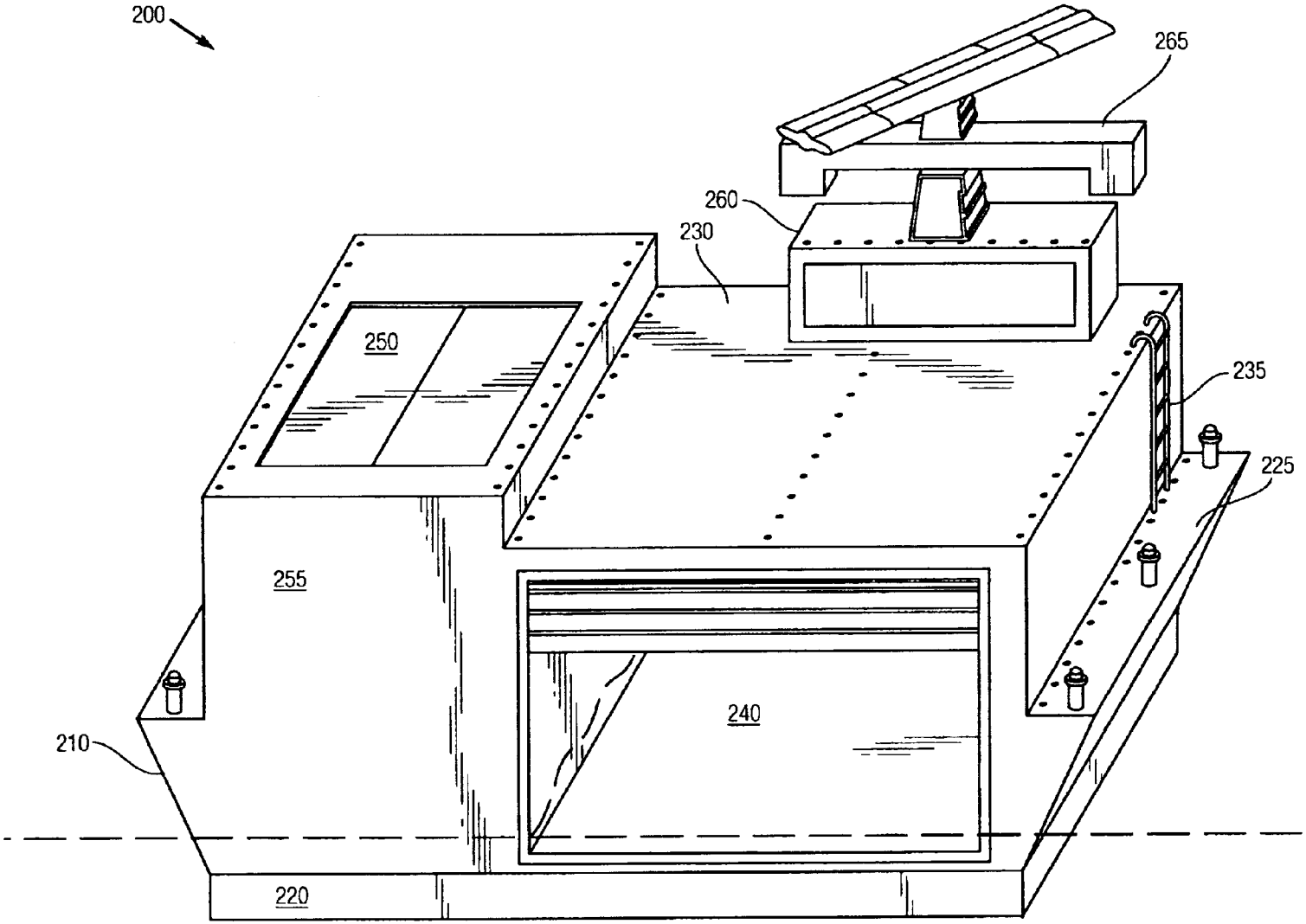
FIG. 2 is an isometric view of the floating platform in a second embodiment.

FIG. 2 shows in perspective a second embodiment 200 of the remote sea base platform. The platform includes a floating hull 210 shown from the stern with a lower portion submerged below the waterline 115. This lower portion includes a fuel storage compartment 220 (that may be subdivided by bulkheads). Above the waterline 115, the hull 210 includes boarding ledges 225 that can flank port and starboard.

On the starboard side, the hull 210 includes an operations roof 230 that covers a hanger 240 for stowage of one or more unmanned surface and submersible vehicles assigned for extended-range patrol. A ladder 235 provides access to the roof 230 from the starboard ledge 225. The vehicles can be launched through vertically raised door that opens leading aft, the floor of the hanger 240 being submerged below the waterline 115.

On the port side, the hull 210 includes aerostat doors 250 that open above to the sky availing access to a compartment 255 for power equipment and unmanned aerial vehicles. The compartment 255 can provide storage space for a variety of aerial vehicles, both powered and static-hovering. At the starboard forecastle (towards the bow), the hull 210 includes an antenna housing 260 with mast and aerials 265 for active radar sweeps.

Artisans of ordinary skill will recognize that these described exemplary embodiments are merely descriptive and not limiting. Alternative arrangements can be designed and produced shifting components, such as interchanging port and starboard disposition of the aerostat 150, 250 and hanger 140, 240 portions of the hull 110, 210. Additionally, unmanned vehicles can be intermittently augmented by small manned vehicles for stowage and deployment, such as patrol boats.

Figure 3:
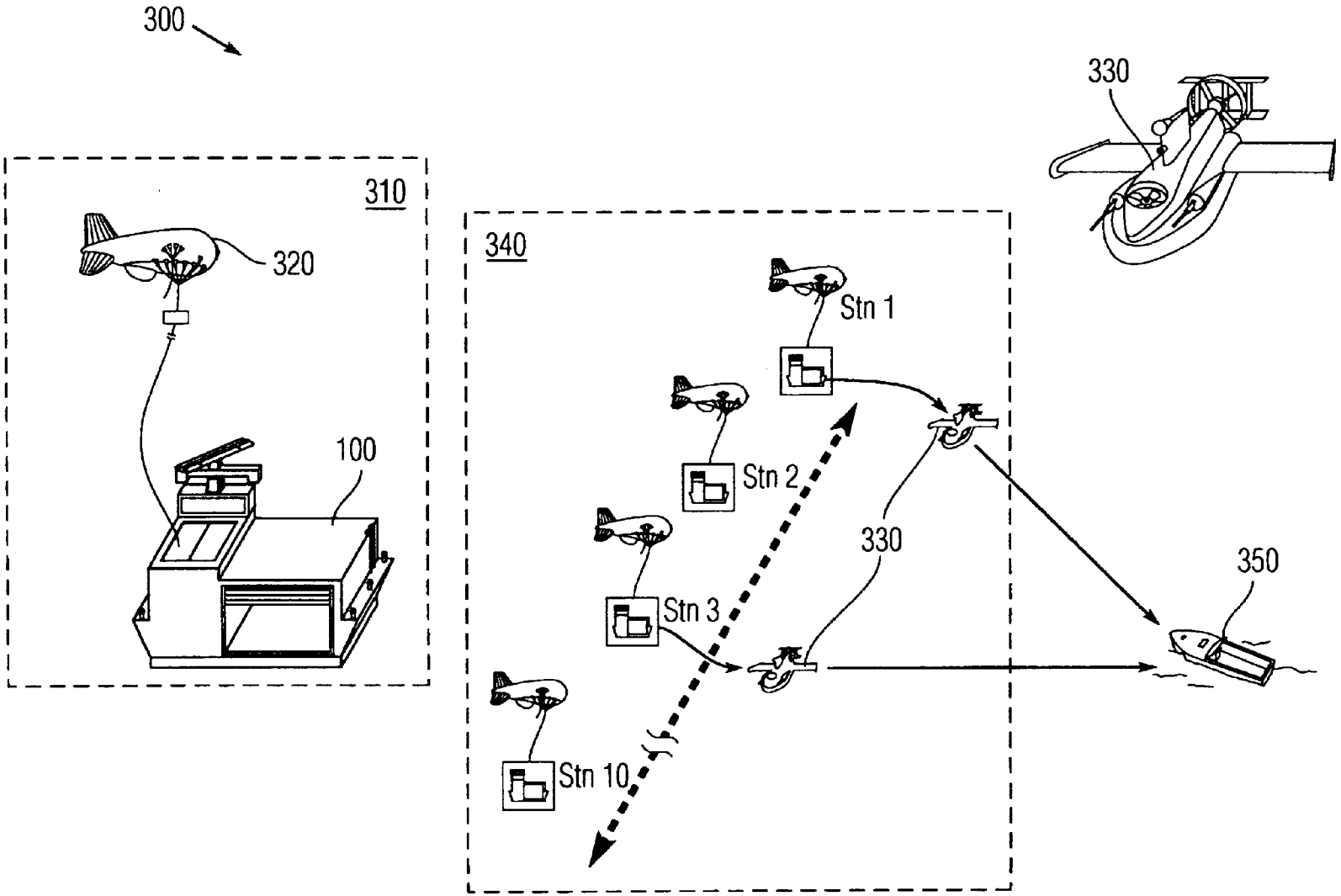
FIG. 3 is block diagram view of an array of deployed platforms.

FIG. 3 shows a block diagram view of an operational assembly 300 of the remote sea base platform 100. In an exemplary operational assembly 310, the platform 100 tethers an unmanned observation balloon 320 from the aerostat 150. The balloon 320 an aerial post from which to survey large areas continuously. The platform 100 can also deploy an unmanned hovercraft 330 as a surface vehicle, shown in isometric view in the upper right corner.

Several operational assemblies 310 can be deployed as an array 340 along an extended demarcation line (e.g., parallel to a shoreline), such as for a thousand nautical miles, as illustrated in this example. This line can include such assemblies 310 at disposal intervals, of which the first, second, third, . . . and tenth stations are shown. An unauthorized speedboat 350 observed by the aerostat 320 can be assigned to one or more hovercraft 330 for interception, as shown deployed by the first and third stations for further investigation, interrogation, and/or attack at minimal risk to uniformed personnel. Artisans of ordinary skill will recognize that other deployment arrangements and auxiliary craft associated with the sea base platform can be envisioned without departing from the scope of the invention.

To permit the remote deployment and staging of several sensor platforms for routine patrol, unmanned vehicles can be used to perform a wide variety of observation and reconnaissance missions related to military and homeland security missions. Such remote-piloted and/or autonomous vehicles can be designed for submerged operations (underwater), at the water surface (surface vehicles or hovercraft) and flying (airborne).

Dispatch of unmanned vehicles conventionally requires deployed proximity of armed forces ships (Navy or Coast Guard) or shore-based host installations, both of which having crews. Only limited options are conventionally available for deploying endurance-limited unmanned air vehicles and no options exist for unmanned surface vehicles on extended-duration missions without a manned host asset or base nearby. Line-of-sight (LOS) restrictions further require presence of manned host assets to supervise and communicate with the unmanned vehicles deployed to intercept an identified intruder for investigation and/or interrogation.

Continuous reconnaissance and patrol of coastal regions using unmanned vehicles within an operational radius without some type of unmanned basing system necessitates unacceptable costs in logistics. Exemplary embodiments provide an unmanned system of floating platforms for to satisfy this requirement. The platforms provide fuel storage and loading systems, shelter from environmental elements, communications, and protection for extended periods of time to unmanned vehicles pre-deployed in areas intended for persistent presence of these vehicles with some necessary interdiction or countermeasure interval. These platforms enable the unmanned vehicles to affordably expand the safety perimeter around fleet assets, and at the entrance to ports, among other regions to be defended.

This sea base platform stows and shelters the unmanned vehicles in standby mode and allows for continuous staging. For patrol or interdiction, the unmanned vehicles can be refueled and deployed absent manned platforms in the vicinity. Optionally, the platform can include tools for standard maintenance and minor repair. Additionally, the hangers can support unmanned systems with a wide variety of sensors and automated data fusion systems for watch at standoff distances from harbors or manned craft. These sensors facilitate persistent surveillance with minimal resources. Optimally queued, the unmanned vehicles enable low-risk interception and low-cost countermeasure capabilities, within minimal autonomous reaction intervals. The platform can be designed to include minimal facilities for human visitation for inspection, modification or other related purposes.

This remote floating station as described above provides a reconfigurable, modular, autonomous and remotely-operated multi-purpose barge or buoy that can preferably be anchored for station-keeping to avoid drift. Alternatively, the station can be free-floating to facilitate redeployment. Such a floating platform can be configured for either sea (blue water) or river (brown water) disposition to provide an operating home base, logistics host, and refuge for wide ranging sensors and primarily unmanned systems.

The sea base platform may be towed out by a sea-worthy tugboat or other appropriate vessel and moored in position for deep sea missions. A littoral base platform may be towed by a smaller tugboat for deployment at the mouth of a river, harbor, or port entrance for either defense or blockade. From the anchored position, one or more of the unmanned vehicles can be dispatched for target reconnaissance and/or interception of unknown or potentially hostile craft. The dispatch orders may optionally be automatically conditioned, or alternatively arranged to transmit an alert to an authorized designate (such as a combat vessel or shore facility).

For proximate missions to shore, such as port defense or river mouth surveillance, radio and/or wire-link communications can be included to enable human-intervention before unmanned vehicle dispatch. For far-field missions at remote locations, satellite communications can be used for exchanging routine maintenance and status update information. The onboard radar system provides self-defense surveillance capability. To extend either communications distances or the area of coverage, the onboard aerostat can be launched to perform either function.

Sensor payloads can be selected based on the mission of the sea base platform and operational environment at the deployment location. Sensors can include but are not limited to received signals or measurements from radar, biological, chemical, radiation, acoustic, optical, infrared and hydroacoustic systems. Specific sensor packages may include anti-submarine warfare suites such as dipping-sonar and acoustic arrays that can be operated autonomously by the sea base platform. Alternate sensor packages may include devices for automated mine clearing along a shipping lane.

Automated data fusion gear, hardware and software can be housed and operated on the platform to accumulate and fuse raw data streams into various levels of knowledge. These data can be transmitted to a host network for further analysis. A sensor fusion example would be automated target recognition of sea lane traffic and queuing of high radiation levels emanating from a vessel within range. Reconfiguration, reprogramming, software uploads, data downloads at any level and remote operation of the sea base platforms can be conducted through the data links using secure-communication methods.

Electrical power can be provided to the unmanned sea base platform by any combination of existing or future fuel and/or energy harvesting schemes. These can include solar, wind, ocean-current, geothermal or other conversion methods that can charge batteries in house-keeping mode. Such systems can be supplemented or substituted by on-board generators depending on the power requirements for selected mission scenarios. For example, high levels of power may be necessary for radar transmission and communications, or to operate rotary wenches and similar devices on-board the platform.

The unmanned sea base platform can be provisioned on location by sea. Periodic maintenance and refueling can be performed by crews who board the platform and execute duties such as operational verification of mooring lights, electronic systems, control panels and moorings. In turn the unmanned sea base platform supports native onboard systems and sensors, capture, launch, and refuel and provide power and communications for the unmanned vehicles.

The sea base platform also provides an unmanned remote logistics base for other emerging unmanned systems. This may include providing a refueling base for unmanned surface vehicles that are not indigenous to the platform, but share a common integrated refueling scheme. Alternatively, this may include service for a non-indigenous aerial vehicle in extended operations from shore beyond its round-trip endurance, such as provide safe haven for manned or unmanned aircraft that experience technical problems or hostile attack and seek refuge. The platform can be reconfigured to support any future system that requires remote predeployed supporting assets and logistic needs.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A remote surveillance system, comprising:

an unmanned floating platform for continual surveillance at a station-keeping position, said platform able to dispatch an unmanned vehicle to conduct at least one of observation and rendezvous, said platform including:

a hull having a submerged portion and a floating portion;

a first hanger for stowing, deploying and retrieving a self-propelled unmanned vehicle, said hanger being substantially disposed in said floating portion;

a second hanger for housing electrical power and on-board equipment; and a liquid storage compartment for supplying fuel to said on-board equipment and to said unmanned vehicle, said compartment being disposed in said submerged portion.

2. The surveillance system according to claim 1, wherein said platform further includes:

a superstructure for housing sensor equipment, said superstructure being disposed above at least one of said first and second hangers.

3. The surveillance system according to claim 2, wherein said superstructure includes a radar transmitter and receiver.

4. The surveillance system according to claim 1, wherein said hull further includes a boarding access ledge for personnel on at least one side.

5. The surveillance system according to claim 1, wherein said second hanger also houses a tetherable observation aerial post.

6. The surveillance system according to claim 1, wherein said unmanned vehicle is a hovercraft.

* * * * *